(12) United States Patent
Son et al.

(10) Patent No.: US 10,581,074 B2
(45) Date of Patent: Mar. 3, 2020

(54) METHOD OF FABRICATING CATHODE ACTIVE MATERIAL OF LITHIUM SECONDARY BATTERY

(71) Applicants: Samsung Electronics Co., Ltd., Suwon-si, Gyeonggi-do (KR); Samsung SDI Co., Ltd., Yongin-si, Gyeonggi-do (KR); Laminar CO., LTD, Seongnam-si, Gyeonggi-do (KR)

(72) Inventors: Youhwan Son, Seongnam-si (KR); Jongpal Hong, Seongnam-si (KR)

(73) Assignees: SAMSUNG ELECTRONICS CO., LTD., Gyeonggi-Do (KR); SAMSUNG SDI CO., LTD., Gyeonggi-Do (KR); LAMINAR CO., LTD, Gyeonggi-Do (KR)

( * ) Notice: Subject to any disclaimer, the term of this patent is extended or adjusted under 35 U.S.C. 154(b) by 231 days.

(21) Appl. No.: 15/651,335

(22) Filed: Jul. 17, 2017

(65) Prior Publication Data
US 2018/0034050 A1    Feb. 1, 2018

(30) Foreign Application Priority Data
Jul. 27, 2016  (KR) .................. 10-2016-0095486

(51) Int. Cl.
*H01M 4/485* (2010.01)
*H01M 4/04* (2006.01)
(Continued)

(52) U.S. Cl.
CPC ............ *H01M 4/485* (2013.01); *C01G 53/50* (2013.01); *H01M 4/0471* (2013.01);
(Continued)

(58) Field of Classification Search
CPC .... H01M 4/485; H01M 4/525; H01M 4/0471; H01M 4/366; H01M 4/1391; C01G 53/50
See application file for complete search history.

(56) References Cited

U.S. PATENT DOCUMENTS

| | | | |
|---|---|---|---|
| 4,325,320 A | 4/1982 | Kirisawa | |
| 6,165,624 A * | 12/2000 | Yoshimura | C01G 45/1221 428/472.1 |
| 2017/0358797 A1* | 12/2017 | Son | H01M 4/366 |

FOREIGN PATENT DOCUMENTS

| | | |
|---|---|---|
| JP | 1999323599 A | 11/1999 |
| KR | 1020130031588 A | 3/2013 |

(Continued)

*Primary Examiner* — Stewart A Fraser
(74) *Attorney, Agent, or Firm* — Cantor Colburn LLP

(57) ABSTRACT

A method of manufacturing a cathode active material, according to the inventive concept includes: disposing a lithium transition metal oxide and a washing liquid into a reaction chamber; contacting the lithium transition metal oxide with the washing liquid to wash the lithium transition metal oxide and form a washed lithium transition metal oxide; disposing a layered double hydroxide into the reaction chamber to form a coating of the layered double hydroxide on a surface of the washed lithium transition metal oxide to provide a coated lithium transition metal oxide; and heat treating the coated lithium transition metal oxide to form a cathode active material, wherein the cathode active material comprises a layered double oxide coated lithium transition metal oxide, and wherein the contacting the lithium transition metal oxide with the washing liquid and the forming of the coated lithium transition metal oxide are consecutively performed in a single space.

20 Claims, 6 Drawing Sheets

(51) Int. Cl.
*H01M 4/1391* (2010.01)
*H01M 4/525* (2010.01)
*C01G 53/00* (2006.01)
*H01M 4/36* (2006.01)
*H01M 4/02* (2006.01)

(52) U.S. Cl.
CPC ......... *H01M 4/1391* (2013.01); *H01M 4/366* (2013.01); *H01M 4/525* (2013.01); *C01P 2004/80* (2013.01); *H01M 2004/028* (2013.01)

(56) References Cited

FOREIGN PATENT DOCUMENTS

| | | | |
|---|---|---|---|
| KR | 1020150076305 | A | 7/2015 |
| KR | 1020150093320 | A | 8/2015 |
| KR | 1020150095428 | A | 8/2015 |
| KR | 1020160028082 | A | 3/2016 |

\* cited by examiner

METHOD OF FABRICATING CATHODE ACTIVE MATERIAL OF LITHIUM SECONDARY BATTERY

CROSS-REFERENCE TO RELATED APPLICATION

This application claims the benefit of Korean Patent Application No. 10-2016-0095486, filed on Jul. 27, 2016, in the Korean Intellectual Property Office, and all the benefits accruing therefrom under 35 U.S.C. § 119, the content of which is incorporated herein in its entirety by reference.

BACKGROUND

1. Field

The present disclosure relates to a method of manufacturing a cathode active material for a lithium secondary battery.

2. Description of the Related Art

Of layered lithium transition metal oxides having high energy density, a ternary layered oxide in which the content of Ni is more than 80% draws attention as a cathode active material for a lithium ion secondary battery. However, in the case of a high Ni content cathode active material, residual lithium, in a form such as LiOH and $Li_2CO_3$, is formed on a surface of the cathode active material in a process of manufacturing the cathode active material. A lithium ion secondary battery including the cathode active material that includes the residual lithium generates $CO_2$ during long duration charge and discharge, and thus, the stability of the secondary battery is reduced. Thus there remains a need for an improved cathode active material, and a method of manufacture thereof.

SUMMARY

Provided are methods of manufacturing a cathode active material, in which washing and treatment of a surface of the cathode active material are consecutively performed in a single space.

Additional aspects will be set forth in part in the description which follows and, in part, will be apparent from the description, or may be learned by practice of the presented embodiments.

According to an aspect of an embodiment, a method of manufacturing a cathode active material includes: disposing a lithium transition metal oxide and a washing liquid into a reaction chamber; contacting the lithium transition metal oxide with the washing liquid to wash the lithium transition metal oxide and form a washed lithium transition metal oxide; disposing a layered double hydroxide (LDH) into the reaction chamber to form a coating on a surface of the washed lithium transition metal oxide to provide a coated lithium transition metal oxide; and heat treating the coated lithium transition metal oxide to form a cathode active material, wherein the cathode active material comprises a layered double oxide coated lithium transition metal oxide, and wherein the contacting the lithium transition metal oxide with the washing liquid and the forming of the coated lithium transition metal oxide are consecutively performed in a single space.

The reaction chamber may be a Couette-Taylor Reactor.

The washing liquid included in the slurry may be mixed with lithium transition metal oxide in a weight ratio of 1.5 to 5 times a total weight of the lithium transition metal oxide.

The LDH may be supplied to the reaction chamber through a surface treatment agent supply port formed on a middle point of a flow length of the reaction chamber.

The LDH may be supplied in a weight ratio of 0.5 weight percent (wt %) to 5.0 wt % of the weight of the lithium transition metal oxide.

The LDH may be expressed as Chemical Formula 1:

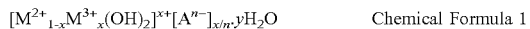

$$[M^{2+}_{1-x}M^{3+}_x(OH)_2]^{x+}[A^{n-}]_{x/n} \cdot yH_2O \qquad \text{Chemical Formula 1}$$

wherein $0.1 \leq x \leq 0.4$, $0 < y$, n is a valence of the anion, $M^{2+}$ is a metal ion and includes $Co^{2+}$, $Mg^{2+}$, $Ni^{2+}$, $Cu^{2+}$, $Zn^{2+}$, or a combination thereof, $M^{3+}$ is a metal ion and includes $Al^{3+}$, $Fe^{3+}$, $V^{3+}$, $Ti^{3+}$, $Ga^{3+}$, or a combination thereof, and $A^{n-}$ is an anion and includes $NO_3^{2-}$, $SO_4^{2-}$, $CO_3^{2-}$, $PO_4^{2-}$, $Cl^-$, or a combination thereof.

The LDH coating may have a thickness in a range from 5 nm to 20 nm.

The heat treatment may be performed for approximately 1 hour to 5 hours at a temperature in a range from about 600° C. to about 800° C.

The Couette-Taylor Reactor may include an outer fixed cylinder and an inner rotation cylinder disposed inside the outer fixed cylinder, wherein the inner rotation cylinder is rotated at a rotation speed of 1200 to 1400 rpm during the washing process and during the process of forming the LDH coating.

The content of Ni in the lithium transition metal oxide may be in a range from 80 at % to 93 at %, based on a total transition metal content of the lithium transition metal oxide.

The method may further include selectively filtering the coated lithium transition metal oxide prior to performing the heat treatment process.

Also disclosed is a cathode active material including: a lithium transition metal oxide; and a layered double hydroxide disposed on a surface of the lithium transition metal oxide, wherein a content of residual lithium is less than 750 parts per million.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
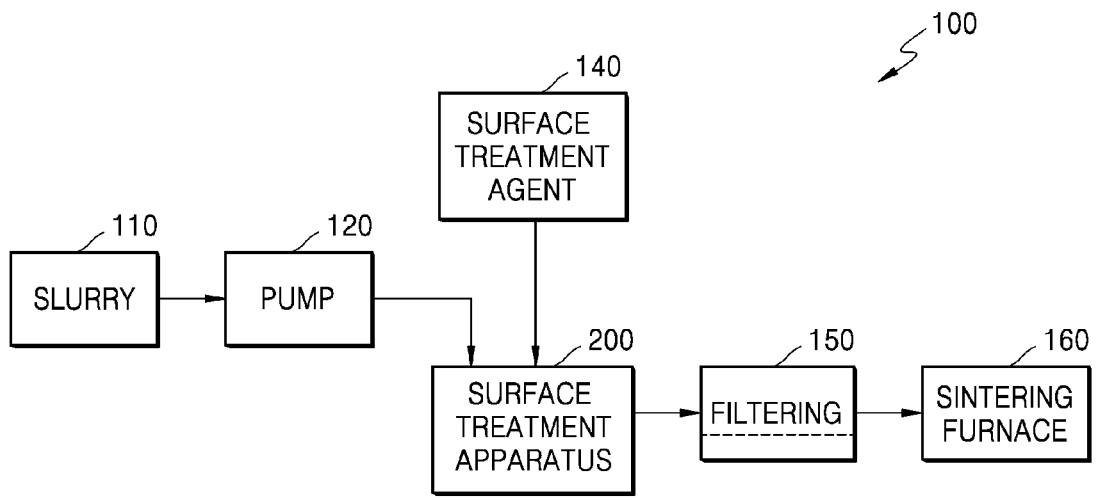
FIG. 1A is a block diagram of a schematic configuration of an embodiment of a manufacturing system used in a method of manufacturing a cathode active material for a lithium ion secondary battery.

Reference will now be made in detail to embodiments, examples of which are illustrated in the accompanying drawings. In the drawings, the thickness of each of layers or sizes may be exaggerated for convenience of explanation or clarity. The exemplary embodiments of the inventive concept are capable of various modifications and may be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

When an element or layer is referred to as being "on" or "above" another element or layer, it includes the element or layer that is directly or indirectly in contact with the another element or layer. Thus it will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/ or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In order to reduce a content of residual lithium in a lithium transition metal oxide, a surface of the cathode active material can be washed with a washing liquid after the cathode active material is manufactured. After the washing process is finished, a layered double hydroxide (LDH) is formed on the surface of the cathode active material to prevent an undesirable reaction between an electrolyte and the active material. When the LDH is formed by using a batch type process, the thickness of the LDH is increased, and thus, charge and discharge efficiency of a lithium ion secondary battery including the cathode active material including the batch formed LDH is reduced.

FIG. 1A is a block diagram of a schematic configuration of an embodiment of a manufacturing system 100 used in a method of manufacturing a cathode active material for a lithium ion secondary battery.

Referring to FIG. 1A, the manufacturing system 100 of a cathode active material of a lithium ion secondary battery may include a slurry storage 110, a slurry pump 120, a surface treatment apparatus 200, a surface treatment agent supply device 140, a filtering unit 150, and a sintering furnace 160.

The slurry pump 120 supplies a slurry to the surface treatment apparatus 200 from the slurry storage 110. The slurry comprises a lithium transition metal oxide, before treatment of a surface thereof, and a washing liquid. The slurry is stored in the slurry storage 110.

The slurry storage may be any suitable container, such as a polyethylene carboy. The slurry pump may be any suitable type of pump, such as a centrifugal pump, a lobe pump or peristaltic hose pump. Further details of the slurry storage 110 and the slurry pump 120 can be determined by one of skill in the art without undue experimentation.

Figure 1B:
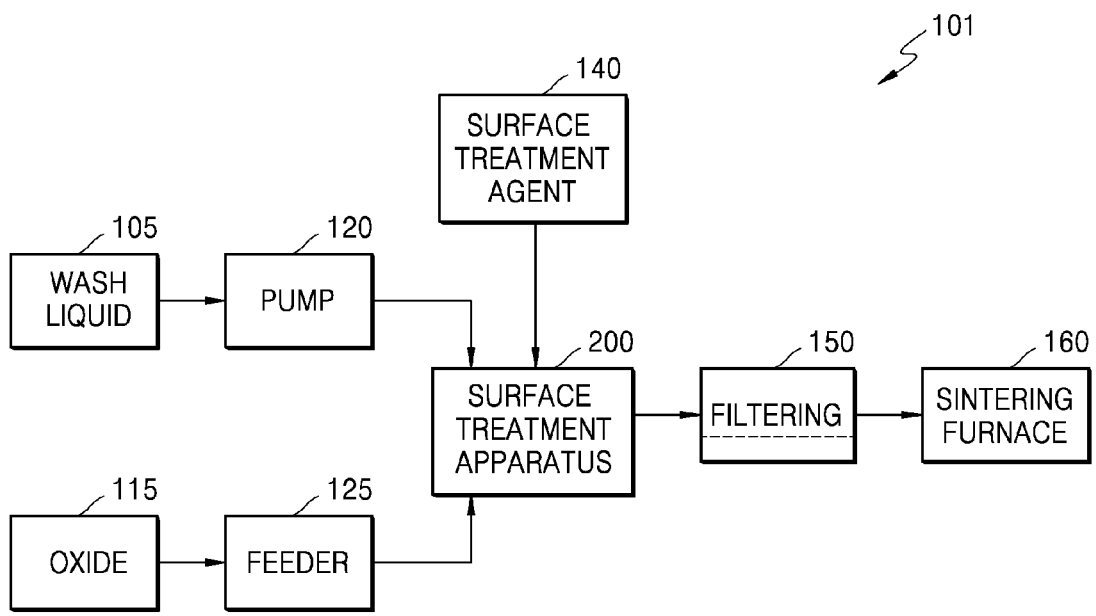
FIG. 1B is a block diagram of a schematic configuration of an embodiment of an alternative manufacturing system used in a method of manufacturing a cathode active material of a lithium ion secondary battery.

Alternatively, the washing liquid and the lithium transition metal oxide may be independently added to the surface treatment apparatus directly, as shown in FIG. 1B. Referring to FIG. 1B, the manufacturing system 101 of a cathode active material of a lithium ion secondary battery may include a washing liquid storage 105, a pump 120, an oxide storage 115, and oxide feeder 125, a surface treatment apparatus 200, a surface treatment agent supply device 140, a filtering unit 150, and a sintering furnace 160. The washing liquid storage may be a carboy, for example, the pump may be a centrifugal pump, for example, the oxide storage may be a metal drum, for example, and the oxide feeder may be in auger, for example. Additional details of the foregoing may be determined by one of skill in the art without undue experimentation.

The lithium transition metal oxide is an oxide in which Li is disposed between layers in a transition metal oxide. The transition metal oxide may include Ni, Co, and Mn. The transition metal oxide may be a ternary system layered oxide that includes Ni, Co, and Mn. The content of Ni in the transition metal oxide may be in a range from about 80 atomic percent (at. %) to about 93 at. %, based on a total transition metal content of the lithium transition metal oxide. The lithium transition metal oxide may be, for example, of the formula $Li_xNi_yCo_zMnO_2$, wherein M is selected from the aluminum, magnesium, manganese, or a combination thereof, x is between about 0 and about 1 and can be varied within this range by electrochemical insertion and extraction, the sum of y+z+n is about 1, y is greater than 0 to about 1, and z and n are each independently 0 to about 1, e.g., 0 to about 0.33. $LiNiO_2$, $LiNi_{1/3}Co_{1/3}Mn_{1/3}O_2$, and $Li_xNi_yCo_zAl_nO_2$ are representative.

The lithium transition metal oxide may be in the form of particles. The shape of the lithium transition metal oxide may be any suitable shape. The shape of the lithium transition metal oxide may be a spherical shape or an ellipsoidal shape. In addition, a mean particle diameter, as measured by light scattering, may, for example, range from 0.1 micrometers (μm) to 50 μm.

The washing liquid may comprise any suitable liquid, and may comprise water, an alcohol, a ketone, or a combination thereof. The water may be deionized (DI) water.

The alcohol may have 1 to 16 carbons. For example, methanol, ethanol, n-propyl alcohol, isopropyl alcohol, n-butyl alcohol, sec-butyl alcohol, isobutyl alcohol, tert-butyl alcohol, 1-pentanol, 2-pentanol, 1-ethyl-1-propanol, 2-methyl-1-butanol, 3-methyl-1-butanol, 3-methyl-2-butanol, neopentyl alcohol, 1-hexanol, 2-methyl-1-pentanol, 4-methyl-2-pentanol, 2-ethyl-1-butanol, 1-heptanol, 2-heptanol, 3-heptanol, 1-octanol, 2-octanol, 2-ethyl-1-hexanol, 1-nonanol, 3,5,5-trimethyl-1-hexanol, 1-decanol, 1-undecanol, 1-dodecanol, allyl alcohol, propargyl alcohol, benzyl alcohol, cyclohexanol, 1-methylcyclohexanol, 2-methylcyclohexanol, 3-methylcyclohexanol, 4-methylcyclohexanol, α-terpineol, 2,6-dimethyl-4-heptanol, nonylalcohol and tetradecylalcohol, may be mentioned. More preferably, methanol, ethanol or isopropylalcohol may, for example, be mentioned.

The ketone is preferably a ketone having 3 to 9 carbons. Specifically, acetone, methyl ethyl ketone, 2-pentanone, 3-pentanone, 2-hexanone, methyl isobutyl ketone, 2-heptanone, 3-heptanone, 4-heptanone, diisobutyl ketone, mesityl oxide, pholone, 2-octanone, cyclohexanone, methylcyclohexanone, isopholone, 2,4-pentanedione, 2,5-hexanedione, diacetone alcohol and acetophenone may, for example, be mentioned. More preferably, acetone or methyl ethyl ketone may, for example be mentioned.

The content of the water, alcohol, and ketone in the washing liquid may be independently selected, and may each independently be 0 to 100 weight percent (wt %), 2 wt % to 98 wt %, or 4 wt % to 90 wt %, based on at total content of the washing liquid. An embodiment in which the washing liquid is water is mentioned.

The washing liquid is mixed with the lithium transition metal oxide in a mixing ratio of approximately 1.5 to about 5 times the weight of the lithium transition metal oxide. In an embodiment, a content of the washing liquid is about 2 to about 4, or about 3 times the weight of the lithium transition metal oxide.

The surface treatment apparatus 200 may include a chamber that contains the slurry supplied from the slurry pump 120, or the washing liquid and the lithium transition metal oxide from the pump 120 and the oxide feeder 125, respectively. The chamber may be a reaction chamber 215 (refer to FIG. 2). In the surface treatment apparatus 200, residual lithium, for example, LiOH and/or $Li_2CO_3$ that remain on a surface of the lithium transition metal oxide, is removed, and afterwards, a coating of a surface treatment agent is formed on the surface of the lithium transition metal oxide. The surface treatment agent may be a layered double hydroxide (LDH). The surface treatment apparatus 200 provides a space (e.g., the reaction chamber 215) where washing and treatment of the surface of the lithium transition metal oxide is performed. The washing and surface treatment processes are performed consecutively.

The surface treatment apparatus 200 may include a surface treatment agent supply port 253 (refer to FIG. 2) through which a surface treatment agent is supplied to a central part of the reaction chamber 215. The surface treatment agent supplied from the surface treatment agent supply device 140 is input to the reaction chamber 215 through the surface treatment agent supply port 253. The surface treatment agent supply port 253 may be formed within 10% of a flow length of the reaction chamber of a middle point of the flow length of the reaction chamber, e.g., on a middle point of a flow length in the reaction chamber 215. The surface treatment agent supply port 253 may have a diameter in a range from 5 millimeters (mm) to about 100 mm, e.g., about 10 mm to about 20 mm. A constant amount of the surface treatment agent may be supplied by using a volumetric pump as the surface treatment agent supply device 140, for example.

The LDH may be expressed as Chemical Formula 1.

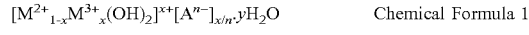

$[M^{2+}{}_{1-x}M^{3+}{}_x(OH)_2]^{x+}[A^{n-}]_{x/n}\cdot yH_2O$      Chemical Formula 1

In Chemical Formula 1, 0.1≤x≤0.4, 0<y, $M^{2+}$ is a metal ion and comprises $Co^{2+}$, $Mg^{2+}$, $Ni^{2+}$, $Cu^{2+}$, $Zn^{2+}$, or a combination thereof, $M^{3+}$ is a metal ion and comprises $Al^{3+}$, $Fe^{3+}$, $V^{3+}$, $Ti^{3+}$, $Ga^{3+}$, or a combination thereof, and A is an anion and comprises $NO_3{}^{2-}$, and $SO_4{}^{2-}$, $CO_3{}^{2-}$, $PO_4{}^{2-}$, $Cl^-$, or a combination thereof, and n is a valence of the anion.

For example, n is a number between 1 and 6. For example, n may be a number between 2 and 6. For example, y is a number between 1 and 6. For example, y is a number between 4 and 6.

For example, LDH may be expressed as Chemical Formula 2.

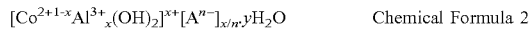

$$[Co^{2+1-x}Al^{3+}_x(OH)_2]^{x+}[A^{n-}]_{x/n}\cdot yH_2O \quad \text{Chemical Formula 2}$$

In the above Chemical Formula 2, 0.1≤x≤0.4, 0<y, and n is a valence of the anion, and A is an anion and comprises $NO_3^{2-}$, $SO_4^{2-}$, $CO_3^{2-}$, $PO_4^{2-}$, $Cl^-$, or a combination thereof. For example, n is a number between 1 and 6. For example, n may be a number between 2 and 6. For example, y is a number between 1 and 6. For example, y is a number between 4 and 6.

Figure 2:
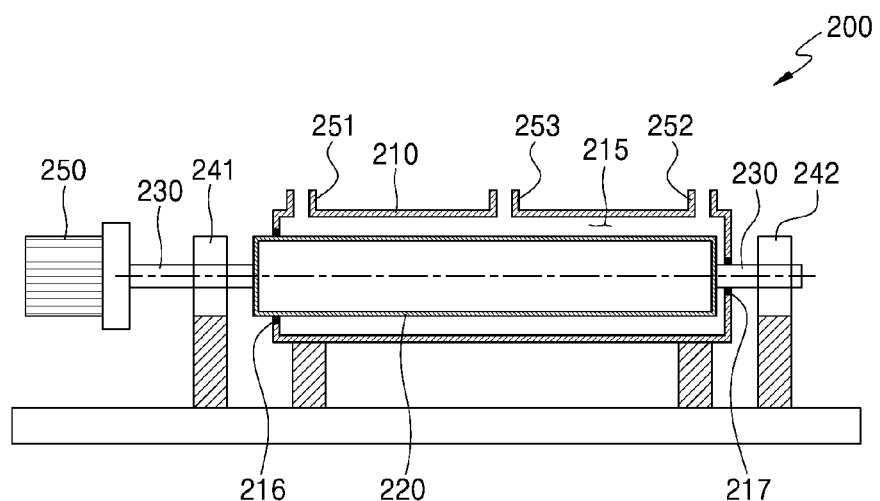
FIG. 2 is a cross-sectional view of a surface treatment apparatus of FIG. 1A.

FIG. 2 is a cross-sectional view of the surface treatment apparatus 200 of FIG. 1. The surface treatment apparatus 200 may be a Couette-Taylor Reactor.

Referring to FIG. 2, the Couette-Taylor Reactor 200 includes an outer fixed cylinder 210 and an inner rotation cylinder 220. The inner rotation cylinder 220 rotates with a constant gap with the outer fixed cylinder 210. A space formed by the gap forms the reaction chamber 215. Both ends of the inner rotation cylinder 220 are blocked. An edge of the inner rotation cylinder 220 is exposed to the outside of the outer fixed cylinder 210 through the outer fixed cylinder 210. The reaction chamber 215 between the outer fixed cylinder 210 and the inner rotation cylinder 220 is sealed by a sealant 216. An edge of the inner rotation cylinder 220 is connected to a rotation axis 230. The rotation axis 230 may be supported by a bearing 241. The rotation axis 230 is rotated by a driving motor 250.

The rotation axis 230 is connected to the other edge of the inner rotation cylinder 220. The rotation axis 230 may pass through an edge of the outer fixed cylinder 210 and may be supported by a bearing 242. A space between the outer fixed cylinder 210 and the rotation axis 230 may be sealed by a sealant 217. Although in FIG. 2 the rotation axis 230 is depicted as separated two parts, the rotation axis 230 according to the current embodiment is not limited thereto. For example, the rotation axis 230 may be formed along a centerline, shown in FIG. 2 as long-and-short dash line.

In the outer fixed cylinder 210, an inlet 251 is formed on an edge side of the inner rotation cylinder 220 and an outlet 252 is formed on the other edge side of the inner rotation cylinder 220. The inlet 251 and the outlet 252 are respectively connected to a reaction chamber 215. The surface treatment agent supply hole 253 is formed between the inlet 251 and the outlet 252. The surface treatment agent supply hole 253 is connected to the reaction chamber 215.

A damper (not shown) for preventing counter flow of slurry may further be formed on the surface treatment agent supply port 253. The damper for preventing counter flow of slurry may be open when a surface treatment agent is supplied and may be closed when the surface treatment agent is not supplied. For example, the damper may be in a closed state by a mechanical force (a weight or a spring) and may be in an open state by pressure of the surface treatment agent during supplying the surface treatment agent. Also, the damper for preventing counter flow of slurry may be a motor-operated damper.

When slurry that includes the lithium transition metal oxide is injected into the reaction chamber 215 through the inlet 251 of the Couette-Taylor Reactor 200 and when the inner rotation cylinder 220 is rotated by driving of the driving motor 250, the slurry flows into the space between the outer fixed cylinder 210 and the inner rotation cylinder 220, that is, the reaction chamber 215, and then, a Taylor vortex is formed. Accordingly, the slurry moves along an axis direction. The slurry flows in a direction from the inlet 251 towards the outlet 252.

The reaction chamber 215, which is a space between the outer fixed cylinder 210 and the inner rotation cylinder 220, is a space for washing and surface treatment of lithium transition metal oxide. The reaction chamber 215 includes a first space for washing the lithium transition metal oxide and a second space for surface treatment in which surfaces of the lithium transition metal oxide are coated with a surface treatment agent supplied through the surface treatment agent supply hole 253. The first space and the second space are consecutive spaces, and there is no physical barrier between them. In the first space, most residual lithium remaining on surfaces of the lithium transition metal oxide particles is removed by a washing process.

In the second space, a surface treatment agent coating is formed on surfaces of the washed lithium transition metal oxide particles. The coating may be an LDH coating.

Slurry passing through the reaction chamber 215 moves to the filtering unit 150 through the outlet 252.

The filtering unit 150 may include a filter that separates the washing liquid from the lithium transition metal oxide. The filter may be a sieve having a mesh shape. On the filtering unit 150, the lithium transition metal oxide of the slurry selectively remain on the filter, and remaining liquid, that is, the washing liquid and the surface treatment agent, may be discharged to the outside through the filtering unit 150.

The lithium transition metal oxide coated with LDH are heat treated in the sintering furnace 160. When the lithium transition metal oxide particles are heat treated for about 1 hour to about 5 hours at a temperature in a range from about 600° C. to about 800° C., moisture evaporates from the LDH coating, and, while not wanting to be bound by theory, it is understood that the LDH coating is transformed to layered double oxide (LDO). Also, lithium may be rearranged between layers of the lithium transition metal oxide. As a result, lithium transition metal oxide coated with LDO is manufactured to provide a cathode active material.

The cathode active material, which comprises the layered double hydroxide disposed on a surface of the lithium transition metal oxide, has a content of residual lithium of about 750 parts per million (ppm) or less, about 100 ppm to about 750 ppm, or about 200 ppm to about 500 ppm. Residual lithium refers to lithium other than lithium of the lithium transition metal oxide, and may be in a form of LiOH and/or $Li_2CO_3$, for example.

The cathode active material may be used in a molding process together with a conductive material to provide a cathode.

Figure 3:
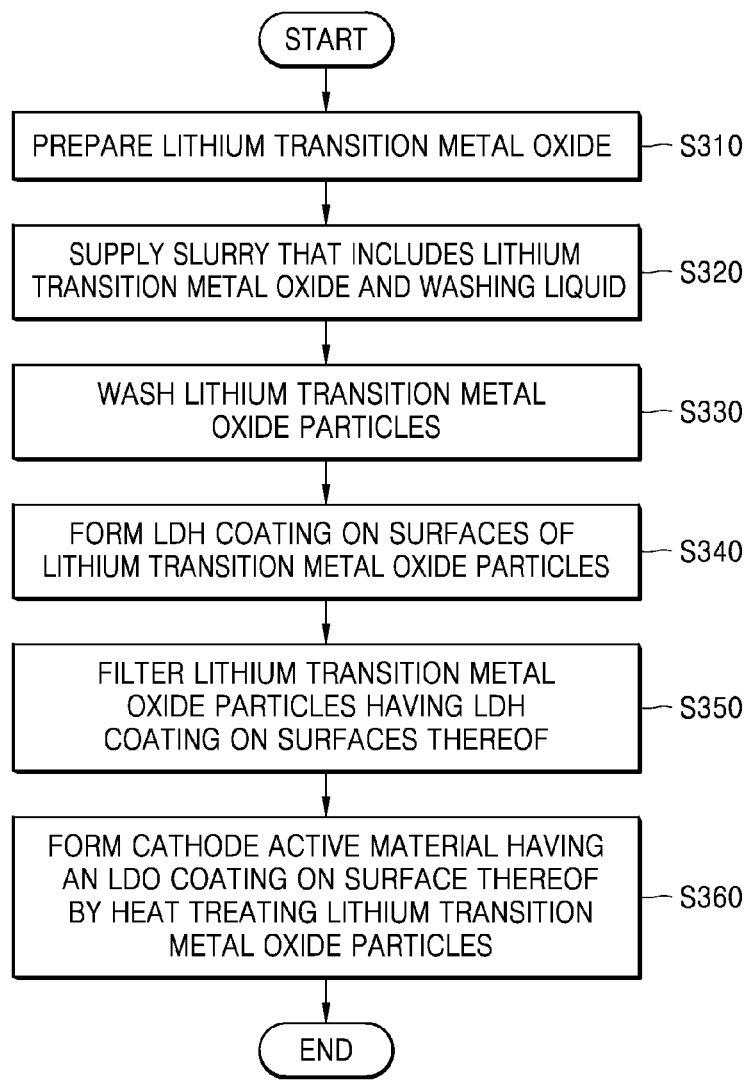
FIG. 3 is a flowchart of a method of manufacturing a cathode active material of a lithium ion secondary battery, according to an embodiment.

FIG. 3 is a flowchart of a method of manufacturing a cathode active material of a lithium ion secondary battery, according to an embodiment.

The method of manufacturing a cathode active material will be described with reference to FIGS. 1 through 3.

First, lithium transition metal oxide is prepared (S310). The transition metal oxide is an oxide in which Li is disposed between layers in a transition metal oxide. As is further disposed above, the transition metal oxide may include Ni, Co, and Mn. The transition metal oxide may be a ternary system layered oxide that includes Ni, Co, and Mn. The content of Ni in the transition metal oxide may be in a range from about 80 at. % to about 93 at. %, based on a total transition metal content of the lithium transition metal oxide. For example, the lithium transition metal oxide may have a composition of $Li_{1.03}Ni_{0.91}Co_{0.05}Mn_{0.04}O_2$.

The lithium transition metal oxide may be manufactured by heat treating a mixture of a first metal oxide precursor and a lithium precursor. For example, $Ni_{0.91}Co_{0.05}Mn_{0.04}OH_4$ may be manufactured by a co-precipitation method. Next, after mixing a lithium precursor in which a ratio of Li:transition metal is 1.03:1, the mixture is heat treated to manufacture lithium transition metal oxide.

The lithium transition metal oxide includes a plurality of particles, and the particles may have a diameter in a range from about 3 μm to about 20 μm. The particle diameter may be measured by light scattering, for example.

Next, a slurry that includes the lithium transition metal oxide and a washing liquid is supplied to the surface treatment apparatus 200 (S320).

Slurry is formed by mixing the lithium transition metal oxide (a plurality of particles) prepared in operation S310 with the washing liquid, and the slurry is stored in the slurry storage 110. The washing liquid is mixed with the lithium transition metal oxide in a mixing ratio of approximately 1.5 to 5 times the weight of the lithium transition metal oxide. The washing liquid may be the ionized (DI) water.

Next, the slurry is supplied to the inlet 251 of the Couette-Taylor Reactor 200 by using the slurry pump 250.

Alternatively, in accordance with the process shown in FIG. 1B, the washing liquid and the lithium transition metal oxide may be added to the surface treatment apparatus and the slurry formed in the surface treatment apparatus.

Next, the lithium transition metal oxide particles are washed (S330).

When the inner rotation cylinder 220 of the Couette-Taylor Reactor 200 is rotated at an rpm greater than a critical value, for example, between 1,200 and 1,400 rpm, particles of fluid located close to the inner rotation cylinder 220 receive momentum in a direction of the outer fixed cylinder 210 and adopt an unstable state, and thus, Taylor vortices, in which the fluid is arranged in a plurality of ring shapes that are regularly and in opposite direction to each other along an axis direction of the inner rotation cylinder 220, are formed. Accordingly, micro-mixing between the lithium transition metal oxide particles and the washing liquid is generated, and as a result, residual lithium on surfaces of the lithium transition metal oxide particles may be effectively removed.

An LDH coating is formed on the surfaces of the lithium transition metal oxide particles by supplying LDH, which is a surface treatment agent, to the surface treatment agent supply port 253 (S340).

An amount of the surface treatment agent, that is, an amount in a range from about 0.5 wt % to about 5 wt %, 0.7 wt % to about 5 wt %, or about 1 wt % to about 3 wt %, of the total weight of the lithium transition metal oxide, e.g., a constant amount, may be supplied from the surface treatment agent supply device 140.

An LDH coating may be formed on the surfaces of the lithium transition metal oxide. The thickness of the LDH coating may vary according to the amount of the surface treatment agent and the surface treatment time. The thickness of the LDH coating may be in a range from about 5 nm to about 20 nm. If the thickness of the LDH coating is less than 5 nm, the coverage of the LDH coating may be reduced. If the thickness of the LDH coating exceeds 20 nm, an LDO coating which will be described below may act as a resistance, and thus, the lifetime and charge and discharge efficiency of a lithium ion secondary battery may be reduced.

Next, the lithium transition metal oxide, on which the LDH coating is formed, is filtered (S350).

The slurry discharged through the outlet 252 of the Couette-Taylor Reactor 200 is supplied to the filtering unit 150. In the filtering unit 150, the lithium transition metal oxide in the slurry remains on a filter, and the washing liquid passes through the filter and is discharged from the filtering unit 150.

Next, a cathode active material is formed by coating LDO on the surfaces of the lithium transition metal oxide particles by heat treating the lithium transition metal oxide particles (S360).

The lithium transition metal oxide having the LDH coating is moved from the filtering unit 150 to the sintering furnace 160, and heat treated to form a cathode active material having a layered double oxide (LDO) coating.

The cathode active material is in a form comprising a plurality of particles and may have a particle diameter in a range from about 2 μm to about 20 μm, about 4 μm to about 15 μm, or about 6 μm to about 10 μm. The thickness of the LDO coating may be almost identical to that of the LDH coating. For example, the thickness of the LDO coating may be in a range from about 5 nm to about 20 nm.

The heat treatment may be performed for about 1 hour to about 5 hours at a temperature in a range from about 600° C. to about 800° C. Prior to the heat treatment process, a process for drying the lithium transition metal oxide particles that include the LDH coating may further be performed. The drying process may be performed for about 10 hours to about 20 hours at a temperature in a range from about 100° C. to about 200° C.

According to the disclosed method of manufacturing a cathode active material of a lithium ion secondary battery, since the washing process for removing residual lithium from surfaces of the lithium transition metal oxide and the process for forming the LDH coating on the surface of the lithium transition metal oxide is consecutively performed in a single space, a manufacturing process is simplified and manufacturing cost is reduced.

Also, since washing and surface treatment processes are performed using the Couette-Taylor Reactor 200, as compared to a batch type process, mass transfer speed is increased, and accordingly, an efficiency of the washing and surface treatment effects is increased.

Figure 4:
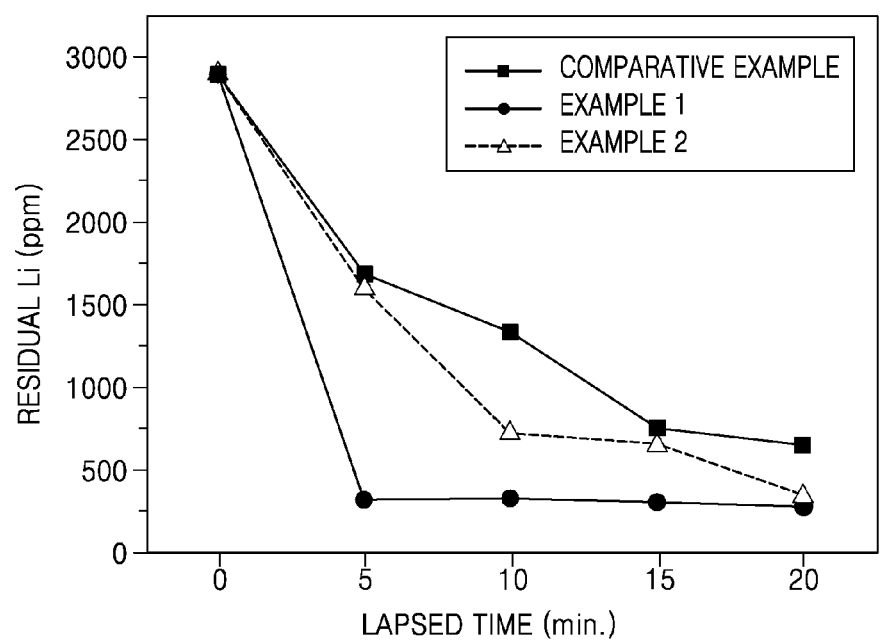
FIG. 4 is a graph of residual Li content (parts per million, ppm) versus lapsed time (minutes, min.) showing washing efficiencies for Examples 1 and 2, and for Comparative Example 1, which is a batch type process.

FIG. 4 is a graph showing washing efficiencies according to an embodiment and a batch type of a related art.

The lithium transition metal oxide before washing was $Li_{1.03}Ni_{0.91}Co_{0.05}Mn_{0.04}O_2$.

EXAMPLES

Comparative Example

Figure 5:
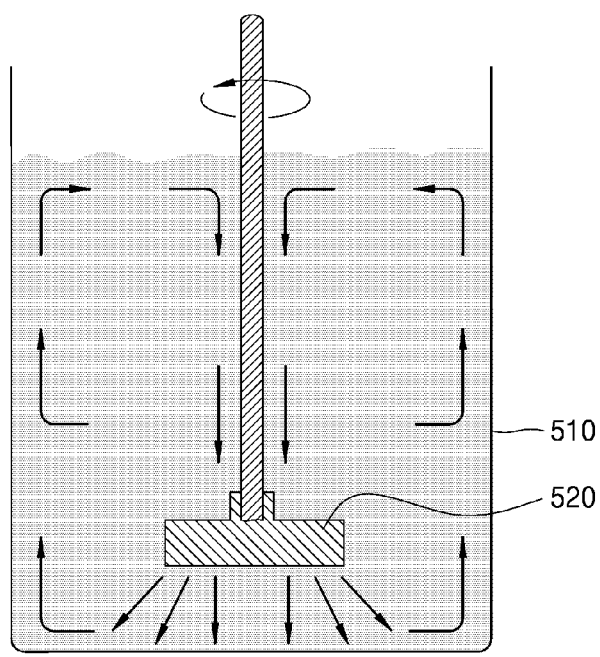
FIG. 5 is a schematic drawing of a batch type mixer.

After washing the lithium transition metal oxide in a batch type mixer, the amount of residual lithium was measured. As depicted in FIG. 5, the batch type mixer is a device in which an impeller 520 is driven by a motor (not shown) in a container 510. When slurry is mixed with the impeller 520 after placing the slurry in the container 510, a micro mixing is occurred.

Example 1

The lithium transition metal oxide was washed in a Couette-Taylor reactor. The lapsed time denotes a time for slurry moving from an inlet to an outlet. A surface treatment agent was not injected. The lapsed time was controlled by rotation of a driving motor of the Couette-Taylor reactor.

Example 2

Washing and surface treatment of the lithium transition metal oxide were sequentially performed in a Couette- Taylor Reactor. CoAl$_2$(OH)$_6$ was used as a surface treatment agent in a weight ratio of 0.01:1 with respect to the weight of the cathode active material. The surface treatment agent was supplied to a middle point of a flow of the lithium transition metal oxide in the Couette-Taylor Reactor. Referring to FIG. 4, if a lapsed time is 10 minutes, for a first half of the lapsed time, that is, for about 5 minutes, a washing process is performed, and for the remaining 5 minutes, a process of coating a surface treatment agent is performed.

Referring to FIG. 4, when the lithium transition metal oxide is washed for 5 minutes, in the Comparative Example, approximately 48% of residual lithium was removed. However, in the Example 1, approximately 91% of the residual lithium was removed. The result denotes that, when the Couette-Taylor Reactor is used, the mass transfer speed is approximately 3 times faster and the mixing strength is approximately 6 times greater than the batch type mixer.

In the Example 2, the residual lithium is removed approximately 50% for a lapse time of 5 minutes. Thus, it shows that the washing efficiency is similar to that of the Comparative Example. In Example 2, the washing time is 2.5 minutes when the lapsed time is 5 minutes, and thus, the washing efficiency is shown as low. In Example 2, when the lapsed time is 10 minutes (a washing process is performed for 5 minutes), the washing efficiency is similar to that of the Example 1.

Figure 6:
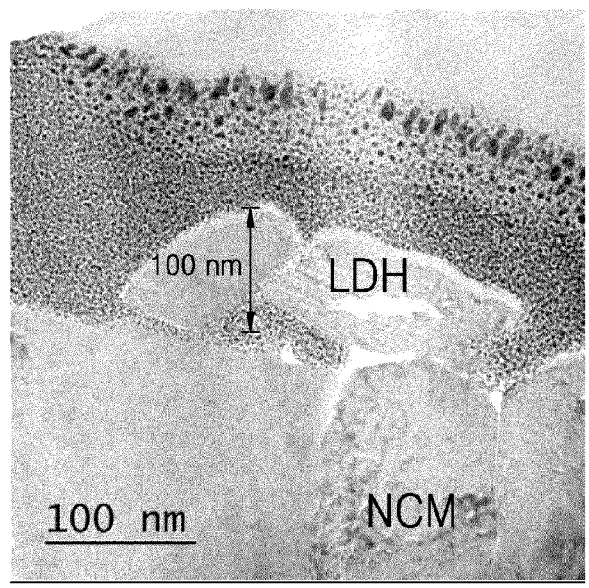
FIG. 6 is a transmission electron microscope (TEM) image of a surface of a lithium transition metal oxide particle after performing a surface treatment process by a batch process.

FIG. 6 is a transmission electron microscope (TEM) image of a surface of a lithium transition metal oxide particle when the lithium transition metal oxide particle is surface treated for 10 minutes with CoAl$_2$(OH)$_6$ as a surface treatment agent in a weight ratio of 0.01:1 with respect to the weight of the cathode active material after performing a washing process for 10 minutes by using a batch type method. It is seen that the thickness of an LDH coating is approximately 100 nm.

Figure 7:
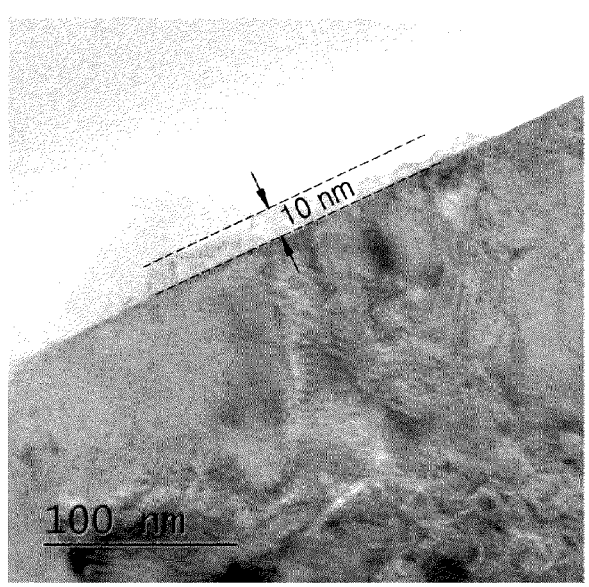
FIG. 7 is a TEM image of a surface of a lithium transition metal oxide particle after performing a surface treatment process according to Example 2.

FIG. 7 is a TEM image of a surface of a lithium transition metal oxide particle after performing washing and surface treatment processes according to Example 2. It is seen that the thickness of the LDH coating is approximately 10 nm.

The LDH coating is formed to prevent a lithium ion secondary battery from degradation due to a negative reaction between a cathode active material and an electrolyte. However, the LDH coating is present as a resistance material, and thus, the LDH coating having a large thickness reduces an efficiency of the lithium ion secondary battery.

As shown, since a washing process for removing residual lithium on the surface of the lithium transition metal oxide and a process of forming an LDH coating on the surface of the lithium transition metal oxide are consecutively performed in the same space, the process of manufacturing a cathode active material is simplified, and thus, manufacturing cost is reduced.

Also, the washing and surface treatment processes are performed using a Couette-Taylor Reactor, and thus, as compared to a batch type mixer, a mass transfer speed is increased, and accordingly, an efficiency of washing and surface treatment is increased.

While an embodiment has been described with reference to the figures, it will be understood by those of ordinary skill in the art that various changes in form and details may be made therein without departing from the spirit and scope as defined by the following claims.

What is claimed is:

1. A method of manufacturing a cathode active material, the method comprising:
disposing a lithium transition metal oxide and a washing liquid into a reaction chamber;
contacting the lithium transition metal oxide with the washing liquid to wash the lithium transition metal oxide and form a washed lithium transition metal oxide;
disposing a layered double hydroxide into the reaction chamber to form a coating of the layered double hydroxide on a surface of the washed lithium transition metal oxide to provide a coated lithium transition metal oxide; and
heat treating the coated lithium transition metal oxide to form a cathode active material, wherein the cathode active material comprises a layered double oxide coated lithium transition metal oxide,
wherein the contacting the lithium transition metal oxide with the washing liquid and the forming of the coated lithium transition metal oxide are consecutively performed in a single space.

2. The method of claim 1, further comprising contacting the lithium transition metal oxide and the washing liquid before the disposing to form a slurry, and
wherein the disposing of the lithium transition metal oxide in the washing liquid comprises disposing the slurry, which comprises the lithium transition metal oxide and the washing liquid, into the reaction chamber.

3. The method of claim 2, wherein the content of Ni in the lithium transition metal oxide is in a range from 80 atomic percent to 93 atomic percent, based on a total transition metal content of the lithium transition metal oxide.

4. The method of claim 1, wherein a content of the washing liquid is about 1.5 to 5 times a total weight of the lithium transition metal oxide.

5. The method of claim 1, wherein the reaction chamber is a Couette-Taylor Reactor.

6. The method of claim 5, wherein the layered double hydroxide is supplied to the reaction chamber through a surface treatment agent supply port, which is disposed within 10% of a flow length of the reaction chamber of a middle point of the flow length of the reaction chamber.

7. The method of claim 6, wherein a content of the layered double hydroxide is 0.5 weight percent to 5 weight percent of a total weight of the lithium transition metal oxide.

8. The method of claim 6, wherein the layered double hydroxide is expressed as Chemical Formula 1:

$$[M^{2+}{}_{1-x}M^{3+}{}_x(OH)_2]^{x+}[A^{n-}]_{x/n} \cdot yH_2O \qquad \text{Chemical Formula 1}$$

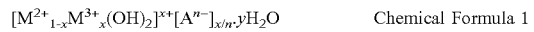

wherein, in Chemical Formula 1,
$0.1 \leq x \leq 0.4$,
$0 < y$,
$M^{2+}$ comprises $Co^{2+}$, $Mg^{2+}$, $Ni^{2+}$, $Cu^{2+}$, $zn^{2+}$, or a combination thereof,
$M^{3+}$ comprises $Al^{3+}$, $Fe^{3+}$, $V^{3+}$, $Ti^{3+}$, $Ga^{3+}$, or a combination thereof, and
A is an anion and comprises $NO_3{}^{2-}$, $SO_4{}^{2-}$, $CO_3{}^{2-}$, $PO_4{}^{2-}$, Cl$^-$, or a combination thereof, and
n is a valence of the anion.

9. The method of claim 5,
wherein the Couette-Taylor Reactor comprises an outer fixed cylinder and an inner rotation cylinder disposed inside the outer fixed cylinder, and
wherein the inner rotation cylinder is rotated at a rotation speed of 1200 revolutions per minute to 1400 revolutions per minute during the contacting the lithium transition metal oxide with the washing liquid and during the disposing of the layered double hydroxide into the reaction chamber to form the layered double hydroxide coating.

10. The method of claim 1, wherein the layered double hydroxide coating has a thickness in a range from 5 nanometers to 20 nanometers.

11. The method of claim 1, wherein the heat treating is performed for about 1 to about 5 hours at a temperature in a range from about 600° C. to about 800° C.

12. The method of claim 1, further comprising selectively filtering the coated lithium transition metal oxide prior to the heat treating.

13. A cathode active material comprising:
a lithium transition metal oxide; and
a layered double hydroxide disposed on a surface of the lithium transition metal oxide,
wherein a content of residual lithium is less than about 750 parts per million.

14. The cathode active material of claim 13, wherein the residual lithium is in a form of LiOH, $Li_2CO_3$, or a combination thereof.

15. The cathode active material of claim 13, wherein the content of residual lithium is between about 100 parts per million and about 750 parts per million.

16. A cathode active material, comprising:
a lithium transition metal oxide; and
a coating comprising a layered double oxide, a layered double hydroxide, or a combination thereof, on a surface of the lithium transition metal oxide,
wherein the coating has a thickness of about 5 nanometers to about 20 nanometers.

17. The cathode active material of claim 16, wherein a content of the layered double hydroxide is 0.5 weight percent to 5 weight percent of a total weight of the lithium transition metal oxide.

18. The cathode active material of claim 16, wherein the layered double hydroxide is expressed as Chemical Formula 1:

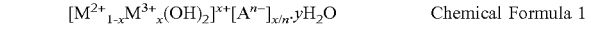  Chemical Formula 1 wherein, in Chemical Formula 1,
$0.1 \leq x \leq 0.4$,
$0 < y$,
$M^{2+}$ comprises $Co^{2+}$, $Mg^{2+}$, $Ni^{2+}$, $Cu^{2+}$, $zn^{2+}$, or a combination thereof,
$M^{3+}$ comprises $Al^{3+}$, $Fe^{3+}$, $V^{3+}$, $Ti^{3+}$, $Ga^{3+}$, or a combination thereof, and
A is an anion and comprises $NO_3^{2-}$, $SO_4^{2-}$, $CO_3^{2-}$, $PO_4^{2-}$, $Cl^-$, or a combination thereof, and
n is a valence of the anion.

19. The cathode active material of claim 16, wherein a content of Ni in the lithium transition metal oxide is in a range from 80 atomic percent to 93 atomic percent, based on a total transition metal content of the lithium transition metal oxide.

20. The cathode active material of claim 19,
wherein a content of residual lithium is less than about 750 parts per million, and
wherein the residual lithium comprises LiOH, $Li_2CO_3$, or a combination thereof.

* * * * *